United States Patent

Ewert

(10) Patent No.: US 11,668,842 B2
(45) Date of Patent: Jun. 6, 2023

(54) METHOD FOR SATELLITE-BASED DETERMINATION OF A VEHICLE POSITION

(71) Applicant: Robert Bosch GmbH, Stuttgart (DE)

(72) Inventor: Marlon Ramon Ewert, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 716 days.

(21) Appl. No.: 16/375,084

(22) Filed: Apr. 4, 2019

(65) Prior Publication Data

US 2019/0317225 A1  Oct. 17, 2019

(30) Foreign Application Priority Data

Apr. 11, 2018 (DE) .................. 10 2018 205 430.4

(51) Int. Cl.
| | |
|---|---|
| *G01S 19/42* | (2010.01) |
| *G01S 19/40* | (2010.01) |
| G01S 19/23 | (2010.01) |
| G01S 19/55 | (2010.01) |
| G01S 19/49 | (2010.01) |
| G01S 19/38 | (2010.01) |

(52) U.S. Cl.
CPC .............. *G01S 19/42* (2013.01); *G01S 19/40* (2013.01); *G01S 19/23* (2013.01); *G01S 19/38* (2013.01); *G01S 19/49* (2013.01); *G01S 19/55* (2013.01)

(58) Field of Classification Search
CPC .......... G01S 19/42; G01S 19/23; G01S 19/55; G01S 19/00; G01S 19/38; G01S 19/40

USPC ............... 342/357.25, 357.23, 357.2, 357.65
See application file for complete search history.

(56) References Cited

U.S. PATENT DOCUMENTS

| | | | | |
|---|---|---|---|---|
| 6,281,836 | B1 * | 8/2001 | Lupash ................ | G01C 21/24 342/357.58 |
| 7,978,127 | B2 * | 7/2011 | Ueda ................... | G01S 19/42 342/357.23 |
| 8,073,619 | B2 * | 12/2011 | Hattori ................ | G01S 19/40 701/445 |
| 8,421,670 | B2 * | 4/2013 | Kojima ............... | G01S 19/426 342/357.25 |
| 8,756,001 | B2 * | 6/2014 | Georgy ............... | G01S 19/47 701/408 |
| 8,898,011 | B2 * | 11/2014 | Peck ................... | G01S 19/20 701/469 |
| 9,377,306 | B2 * | 6/2016 | Gmerek ............... | G01C 21/20 |
| 9,430,947 | B2 * | 8/2016 | Richardson ......... | G08G 3/02 |

(Continued)

FOREIGN PATENT DOCUMENTS

| | | |
|---|---|---|
| CN | 102472822 A | 5/2012 |
| CN | 106574976 A | 4/2017 |
| CN | 107533801 A | 1/2018 |

*Primary Examiner* — Chuong P Nguyen
(74) *Attorney, Agent, or Firm* — Maginot, Moore & Beck LLP

(57) ABSTRACT

The disclosure relates to a method for satellite-based determination of a vehicle position, comprising the following steps: a) receiving GNSS satellite data; b) determining a vehicle's position with the GNSS satellite data received in step a); c) providing input variables that can have an effect on the accuracy of the vehicle position determined in step b); d) determining a positional accuracy of the vehicle position determined in step b) using an algorithm that assigns a positional accuracy to a vehicle position; and e) adapting the algorithm.

13 Claims, 1 Drawing Sheet

(56) References Cited

U.S. PATENT DOCUMENTS

| | | | | |
|---|---|---|---|---|
| 9,864,064 | B2* | 1/2018 | Ishigami | G01C 21/30 |
| 10,247,830 | B2* | 4/2019 | Hosoya | G01S 19/49 |
| 10,908,296 | B2* | 2/2021 | Dumas | G01S 19/40 |
| 11,119,222 | B2* | 9/2021 | Lee | G01S 19/15 |
| 11,143,765 | B2* | 10/2021 | Orejas | G01S 19/20 |
| 2007/0203647 | A1* | 8/2007 | Mizuochi | G01S 19/52 |
| | | | | 701/469 |
| 2009/0043495 | A1* | 2/2009 | Hattori | G01S 19/49 |
| | | | | 701/532 |
| 2014/0070988 | A1* | 3/2014 | Peck | G01S 19/20 |
| | | | | 342/357.24 |
| 2018/0239032 | A1* | 8/2018 | Thiel | G01C 21/28 |
| 2019/0339083 | A1* | 11/2019 | Ewert | G01C 21/165 |
| 2019/0339396 | A1* | 11/2019 | Turunen | G01S 19/26 |
| 2021/0072407 | A1* | 3/2021 | Talbot | G01S 19/20 |
| 2022/0128707 | A1* | 4/2022 | Knoedler | G01S 19/40 |

* cited by examiner

METHOD FOR SATELLITE-BASED DETERMINATION OF A VEHICLE POSITION

This application claims priority under 35 U.S.C. § 119 to application no. DE 10 2018 205 430.4, filed on Apr. 11, 2018 in Germany, the disclosure of which is incorporated herein by reference in its entirety.

TECHNICAL FIELD

The disclosure relates to a method for satellite-based determination of a vehicle position, a method for improving the accuracy estimation of a vehicle position determined by satellite, a computer program, a machine-readable storage medium and a motion and position sensor. The disclosure is related in particular to applications in autonomous driving.

BACKGROUND

An autonomous vehicle is a vehicle which functions without a driver. The vehicle drives autonomously, for example by independently detecting the course of the road, other road users or obstacles, and computing the corresponding control commands in the vehicle and then forwarding these to the actuators in the vehicle, causing the driving course of the vehicle to be appropriately affected. In the case of a fully autonomous vehicle the driver is not involved in the driving process.

Currently available vehicles are not yet capable of acting autonomously. For one thing, because the appropriate technology is not yet fully matured. For another, because at present it is still prescribed by law that the vehicle driver must be able to intervene in the driving process at any time. This complicates the implementation of autonomous vehicles. However, there are already systems from different manufacturers that implement autonomous or partially autonomous driving. These systems are currently in the intensive testing phase. It is already foreseeable that in a few years, fully autonomous vehicle systems will come onto the market as soon as the above hurdles are overcome.

One of the requirements for autonomous operation of a vehicle is a sensor device which is capable of determining a highly accurate vehicle position, particularly on the basis of navigation satellite data (GPS, GLONASS, Beidou, Galileo). For this purpose, GNSS (Global Navigation Satellite System) signals are currently received via a GNSS antenna on the roof of the vehicle and processed by means of a GNSS sensor. In addition to this, GNSS correction data can be taken into account in order to increase the localization results. Particularly advantageously, GNSS sensors are so-called motion and position sensors which can determine at least a vehicle position or a vehicle orientation or vehicle motion using GNSS data.

The motion and position sensor allows a highly accurate determination of the vehicle's ego position to be made. To this end, in addition to the GNSS data, GNSS correction data, vehicle wheel speeds and steering angles of the vehicle are also used in the motion and position sensor to determine the position of the vehicle with high accuracy. The individual input data are merged within a Kalman filter to form an (overall) vehicle position. The result is an estimated (self-)position of the vehicle in the world, for example, in GNSS coordinates.

As described, using a motion and position sensor, a merged vehicle position is determined (from GNSS, GNSS correction data, wheel speeds, steering wheel angle, acceleration data, engine speed data, etc.). This high-precision vehicle position of the motion and position sensor is subject to fluctuations in accuracy, however. It is desirable, therefore, that a statistical indication of the instantaneously available positional accuracy is also derived from the motion and position sensor. This statistical indication is a statistical positional accuracy, which is known in the technical field as a so-called protection limit (PL). For example, the position deviation of the vehicle must be no greater than a certain number in meters in the driving direction, no greater than a certain number in meters in the transverse direction and no greater than a certain number in meters in elevation. If the protection limit is exceeded, then for example, a warning is output from the motion and position sensor. Other control devices of the vehicle, which access the position from the motion and position sensor, can use this information to either allow or prevent a further processing of the motion and position sensor data.

For this purpose, the protection limit must be determined statistically as accurately as possible. For example, the instantaneously available positional accuracy in modern motion and position sensors is determined on the basis of the currently prevailing scenario in the vehicle and a lookup table. This lookup table is calibrated with as many scenarios as possible with regard to the existing parameters. This requires vast numbers of driving scenarios, which contain, for example, different driving trajectories and/or different GNSS satellite constellation data. Therefore it is not possible in practice to fully parameterize such a lookup table for all possible scenarios that can ever occur in a vehicle. For example, every conceivable driving scenario at every time and at every position in the world would have to be recorded at once, which would then be used for the parameterization of the statistics of a position specification from the motion and position sensor based on different scenarios. This is not possible in practice, since, for example, the number of scenarios occurring during a test drive is limited. In addition, the number of vehicles used for this data recording is also limited.

SUMMARY

The disclosure relates to a method for satellite-based determination of a vehicle position, comprising the following steps:
  a) receiving GNSS satellite data,
  b) determining a vehicle position with the GNSS satellite data received in step a),
  c) providing input variables that can have an effect on the accuracy of the vehicle position determined in step b),
  d) determining a positional accuracy of the vehicle position determined in step b) using an algorithm that assigns a positional accuracy to a vehicle position,
  e) adapting the algorithm.

The method is used, in particular, for satellite-based determination of a vehicle position by means of a motion and position sensor of a vehicle or the ego vehicle. The (ego) vehicle is preferably an autonomous vehicle, in particular an autonomously operating automobile. GNSS stands for global navigation satellite system. GNSS is a system for position determination and/or navigation on land and/or in the air by the reception of signals from navigation satellites, referred to here as satellite data. GNSS is a collective term for the use of existing and future global satellite systems, such as GPS (NAVSTRAR, GPS), GLONASS, Beidou and Galileo. Therefore a GNSS sensor is a sensor device which is suitable for receiving and processing navigation satellite data, for example evaluating them. The GNSS sensor is preferably capable of determining a highly accurate vehicle position by means of navigation satellite data (GPS, GLONASS, Beidou, Galileo). GNSS data are, in particular, data that are received from a navigation satellite, GNSS data can also be referred to as "navigation satellite data".

In step a) GNSS satellite data are received. Preferably, a motion and position sensor of the ego vehicle receives the GNSS satellite data from at least one GNSS receiver unit (of the vehicle), such as, in particular, a vehicle-mounted GNSS antenna, which in turn communicates (directly) with the navigation satellites and/or (directly) receives the satellite signals. In step b) a vehicle position (of the ego vehicle) is determined with the GNSS satellite data received in step a). In step b) the ego vehicle position is preferably determined by means of the motion and position sensor of the ego vehicle. At least in step a) or b), transit time measurements of satellite navigation signals can be carried out.

In step c) input variables are provided that can have an effect on the accuracy of the vehicle position determined in step b). One or more of the following variables or data, among others, can be used as input variables:
- date and time of a vehicle position,
- satellite constellation (ephemeris data) or number of satellites available at this position with satellite number,
- signal strength or carrier-to-noise ratio of the available satellites at this position at this date in this scenario,
- data from environmental sensors of the vehicle which allow inferences to be made about other structures around the vehicle and/or the road users around the vehicle (for example, if a lorry is located near the ego vehicle, which, for example, is currently masking specific satellites),
- position data of other road users,
- data of other road users, such as their length, width and/or height,
- speed of the other road users, in particular in relation to the ego vehicle,
- speed of the ego vehicle,
- structures or features such as points of infrastructure (buildings, signs, traffic lights), around the ego vehicle,
- instantaneous acceleration and/or rotation rate of the ego vehicle,
- wheel speeds and/or direction of rotation of the wheels of the ego vehicle,
- steering angle of the ego vehicle,
- availability and/or data content of at least one GNSS correction service (via L-band or car-to-X communication link).

In particular, the above input variables are not exhaustive. It is already evident here that a lookup table, which intended to use all the above-mentioned input variables would require an infeasible amount of memory within the (autonomous) vehicle or within the motion and position sensor. Even if all possible scenarios were stored the lookup table would in practice never be complete. Surprisingly, it has been found that an algorithm and, in particular, a learning algorithm is very advantageous as a replacement for the lookup table used to date, because, on the one hand, this allows huge savings in storage space and, surprisingly, in addition, a more complete coverage of all possible scenarios may be possible than is the case with a lookup table.

In step d) a (statistical) positional accuracy of the vehicle position determined in step b) is determined using an algorithm which assigns a positional accuracy to a (determined) vehicle position. The algorithm preferably assigns a positional accuracy to a (determined) vehicle position, taking into account at least one of the input variables. Particularly preferably, the algorithm determines or computes the (statistical) positional accuracy of the vehicle position calculated in step b) as a function of the vehicle position determined in step b) and at least one of the input variables provided in step c). For example, as an output value the algorithm can output a deviation of +/−1 meter or, for example, 2%, (for the actual vehicle position), if it is provided with input values in the form of a determined vehicle position and a time (date and time of day), at which the vehicle position was determined. In other words, this example means, in particular, that in the algorithm the information is stored (in the manner of a functional relationship) that at a specific determined position and at a specific time a specific inaccuracy of the determination is to be expected. Expressed in other words again, the algorithm in the example described here describes the positional accuracy as a function of the determined position of the vehicle and the time.

Between the steps d) and e) an assignment of the positional accuracy determined in step d) to the position of the vehicle determined in step b) can be carried out. This allows, in an advantageous way, a component, for example a control unit for the autonomous driving of a vehicle, to which a value pair, which here results, for example, from the assignment, to be able to decide whether and, if so, how it would like to use this vehicle position.

In step e) an adaptation of the algorithm is carried out. This is used, in particular, for the determination of the protection limit. Preferably, the adaptation of the algorithm is carried out taking into account the input variables provided in step c), or at least one of the input variables provided in step c) and/or by taking account of a reference position or a comparison between the calculated position of the vehicle and an associated reference position. Returning to the above example, if, for example, on the basis of the comparison of the calculated vehicle position with the reference position it was detected that at the calculated position of the vehicle at a particular time a deviation of, for example, +/−1 meters or, for example, 2% (for the actual position of the vehicle) exists, the algorithm for the determination of the protection limit is adapted such that it can reproduce this relationship.

The algorithm is preferably a so-called learning algorithm. The adaptation of the algorithm is preferably carried out during or after a learning phase. A particular aspect of the solution presented here can be seen in the fact that the lookup table used to date is replaced by an algorithm, in particular a learning algorithm. In particular, the algorithm is configured for calculating the statistical accuracy (Protection Limit) of an available vehicle position, or one determined by means of a motion and position sensor. This means in other words, in particular, that the algorithm specifies a functional relationship for the positional accuracy of a motion and position sensor.

According to an advantageous design, it is proposed that the steps a) to e) be carried out on the vehicle side. This means in other words, in particular, that all the steps a) to e) are carried out by sensors and/or control units of the ego vehicle. The adaptation according to step e) can be carried out, for example, during a learning phase. In addition, it can be provided that the algorithm is further refined and/or adapted externally to the vehicle. The adaptation according to step e) in this case, for example, can be in such a form that the algorithm stored in the vehicle is replaced or updated by the vehicle-externally refined or adapted algorithm, or that these algorithms are merged.

Preferably, even before a first adaptation in step e) an algorithm is provided, which is used in step d) for determining the positional accuracy. This algorithm can be referred to as the "initial" algorithm. For example, it can be stored in a control unit and/or a memory.

According to a further advantageous design, it is proposed that at least step e) is carried out externally to the vehicle and at least one information item for adapting an algorithm stored on the vehicle is provided to at least one vehicle. To this end, step e) can be carried out by a central processing unit, which can receive data and/or algorithms from a plurality of vehicles. In addition, it is advantageous if the vehicle-externally adapted algorithm is made available to a plurality of vehicles.

According to an advantageous design, it is proposed that the algorithm determines the positional accuracy as a function of the (determined and/or GNSS-based) vehicle position and at least one of the input variables. Particularly preferably, the algorithm determines or computes the (statistical) positional accuracy of the vehicle position calculated in step b) as a function of the vehicle position determined in step b) and at least one of the input variables provided in step c). Returning to the above example, as an output value the algorithm could output a deviation of +/−1 meter or, for example, 2%, (relative to the actual vehicle position), if it is provided with input values in the form of a determined vehicle position and a time (date and time of day), at which the vehicle position was determined.

According to a further aspect, a method for improving the accuracy estimation of a satellite-based determination of a vehicle position is proposed, comprising the following steps:
 i) detecting a GNSS-based vehicle position,
 ii) receiving input variables that can have an effect on the accuracy of the vehicle position detected in step i),
 iii) detecting a reference position for the vehicle position detected in step i)
 iv) adapting an algorithm that assigns a positional accuracy to a [determined] vehicle position, taking into account [as a function of] at least one comparison between the vehicle position detected in step i) and the reference position detected in step iii) or at least one of the input variables received in step ii).

The method is preferably used for automatically determining a so-called protection limit in a motion and position sensor. In addition, the method contributes to the provision of a (learning) algorithm, which in an advantageous way can replace a lookup table as used to date (by functional relationships).

In step i) a detection of a GNSS-based vehicle position is carried out. For this purpose, the GNSS-based vehicle position can be determined, for example, by means of a motion and position sensor of the vehicle. In addition, the (calculated) GNSS-based vehicle position can be received, for example, by a control unit of the vehicle. Furthermore, the (calculated) GNSS-based vehicle position can be received by a (vehicle-external) central processing device.

In step ii) input variables are received that can have an effect on the accuracy of the vehicle position determined in step i). With regard to the input variables, reference is made to the above input variables referred to in connection with the method for satellite-based determination of a vehicle position. The input variables can be provided, for example, by corresponding sensors of the (ego) vehicle. In addition, the input variables can be received, for example, by a control unit and/or a motion and position sensor of the vehicle. Furthermore, the input variables can be received by a (vehicle-external) central processing device.

In step iii) a reference position is detected for the vehicle position detected in step i). The reference position is normally a (highly accurate) vehicle position obtained from an alternative positioning system (i.e. different to the motion and position sensor of the ego vehicle). The alternative positioning system is located in particular within the ego vehicle. For example, the reference position can be determined by locating the vehicle on a (digital) map (so-called feature map), for example using a map control device, using environmental sensor data or by means of the transit time of car-to-X communication signals. The reference position relates in particular to the actual vehicle position, or a more accurate position than the one determined (using GNSS-based methods or with the motion and position sensor) at the time at which the determined or GNSS-based vehicle position is determined. The reference position can be received, for example, by a control unit and/or a motion and position sensor of the vehicle. Furthermore, the reference position can be received by a (vehicle-external) central processing device.

The term car-to-car communication (or in short: Car2Car or C2C) is understood to mean the exchange of information and data between (motor) vehicles. The aim of this data exchange is to alert the driver of critical and dangerous situations at an early stage. The vehicles concerned collect data, such as ABS interventions, steering angle, position, direction and speed, and send these data via wireless (WLAN, UMTS, etc.) to the other road users. The purpose of this is to extend the "visible range" of the driver by electronic means. Car-to-infrastructure communication (or in short: C2I), is understood to mean the exchange of data between a vehicle and the surrounding infrastructure (e.g. traffic light systems). The technologies mentioned above are based on the interaction of sensors of the different traffic participants and use the latest methods from communications technology for exchanging this information. Car-to-X is a generic term for the various communication links, such as car-to-car and car-to-infrastructure.

In step iv) an adaptation is carried out of an algorithm that assigns a positional accuracy to a (calculated or GNSS-based) vehicle position, taking into account at least one comparison between the vehicle position detected in step i) and the reference position detected in step iii) or at least one of the input variables received in step ii). The input variables are usually those which were present at the time when the calculated or GNSS-based vehicle position and/or the reference position were calculated, and/or determined or measured. In other words, the input variables, the (calculated or GNSS-based) vehicle position and the reference position normally have the same time stamp. Preferably, the algorithm is adapted depending on the comparison between the (calculated or GNSS-based) vehicle position and the reference position, and on at least one of the input variables. The comparison usually provides a position deviation or positional accuracy (of the motion and position sensor) at the relevant position of the vehicle. This means in other words, in particular, that the comparison describes the instantaneous position deviation of the motion and position sensor relative to a reference system. The position deviation is usually caused by at least one of the input variables. Returning to the above example, at a certain position of the vehicle, for example, at any given time (input variable) a position deviation can occur, for example as a result of a time-dependent fault and/or shadowing of the GNSS signal. This deviation can be determined by the comparison of the vehicle position relative to the reference position at the given time. The algorithm can then be adapted such that it can represent this relationship.

According to an advantageous design, it is proposed that the steps i) to iv) are carried out externally to the vehicle. The steps i) to iv) are preferably carried out by a central and/or higher-level processing device. The vehicle position (s), the reference position(s) and the input variables can be transmitted to the processing device, for example, by means of a wireless link, in particular car-to-X communication link. In addition, the adapted algorithm can be transmitted from the processing device to the (ego) vehicle and/or a plurality of vehicles, for example, by means of a wireless link, in particular car-to-X communication link. The processing device can be formed in the manner of a so-called cloud or in the manner of a so-called HIL (hardware in the loop) system.

Preferably, the transmission of the input data takes place together with an instantaneous position deviation of the motion and position sensor relative to a reference system, into a cloud or a HIL (hardware in the loop) system (for example, using a car-to-X communication link). The adaptation (correction) of the algorithm is now preferably carried out in the cloud or the HIL with the aid of the input data and/or position deviations from at least one vehicle. Preferably, however, the input data and/or position deviations of other vehicles are also used. The cloud or the HIL usually have a significantly higher computing capacity than the motion and position sensor. In this way, the algorithm for outputting the positional accuracy (of the protection limit) can advantageously be adapted (corrected) as quickly as possible and, in particular, transmitted back via a car-to-X communication link to the vehicles equipped with a motion and position sensor. It is additionally advantageous if the individual algorithms, which were learned (in terms of the weights) on a plurality of motion and position sensors of a plurality of vehicles, in particular with the aid of a plurality of new scenarios, are transmitted into the cloud or to the HIL and combined or merged there into an overall algorithm. For example, an averaging of weights of the individual algorithms (individual AI systems) can be carried out. In addition, the weights of the individual algorithms can advantageously be statistically combined. Furthermore, the weights of the individual algorithms can be weighted and/or dominated on the basis of the existing scenarios.

It can also be provided that (only) the vehicle position and the input variables are transmitted from the vehicle to the central and/or higher-level processing device, and received by this. The reference position in this case can be determined by the central and/or higher-level processing device itself. Preferably, the motion and position sensor transmits (only) its instantaneously calculated position and/or the instantaneous values of the input variables to the central and/or higher-level processing device. Within the processing unit a highly accurate positioning of the corresponding vehicle can be carried out, for example, with the aid of a car-to-X communication link (transit time of the signals) for determining the reference position.

According to another advantageous design, it is proposed that the steps i) to iv) are carried out on the vehicle side. For example, the steps i) to iv) can be carried out by a motion and position sensor and/or a control unit, in particular a control unit for the autonomous driving of the vehicle. The steps i) to iv) are carried out on the vehicle side, in particular in a test vehicle.

According to a further advantageous design, it is proposed that the adaptation of the algorithm is carried out automatically. The algorithm is preferably a self-learning algorithm. Preferably, an approach is taken which is either based on or uses artificial intelligence (AI) methods. This means in other words, in particular, that the (learning) algorithm provides the calculation of the positional inaccuracy (of the protection limit) (of the motion and position sensor) through the use of an artificial intelligence (AI) system. This learning algorithm can be, for example, an artificial intelligence (AI) system, such as a neural network with weights. As the input data into this neural network, one or more of the input variables described above and/or the reference position can be used (among other variables).

According to an advantageous design, it is proposed that the algorithm is an (artificial) neural network with at least weights or threshold values. The neural network or the AI system uses the above input variables as inputs and with the aid of learned weights and/or threshold values within the network or the AI system, calculates the statistical positional accuracy of a (calculated) vehicle position or a (GNSS) position computed in the motion and position sensor.

According to an advantageous design, it is proposed that in step d) at least one weight or one threshold value of the algorithm is adjusted. For setting the (internal) weights and/or threshold values, the neural network or the AI system uses a reference position preferably acquired (in step iii)). This reference position can originate from another positioning system. Particularly in the case of a test vehicle, this can be, for example, a (high-accuracy) GNSS reference system, which is fitted in the vehicle. Particularly in the case of a series production vehicle, for the continuous adaptation (correction) of the network or the AI system an alternative position of the vehicle may advantageously be used. This can be calculated, for example, from the transit time of car-to-X communication signals (for example in relation to infrastructure points and/or neighboring vehicles) and/or determined from a (high-accuracy) position determination of the vehicle using features on a (digital) map and/or with the inclusion of environmental sensor data.

A (true) learning of the network or AI system for the positional accuracy (the protection limit) is preferably carried out by comparing the reference position with a (GNSS-based) (vehicle) position or GNSS-based, merged (vehicle) position (actually) calculated by the motion and position sensor. The GNSS-based merged position in this case is usually a GNSS position calculated by a Kalman filter, which uses not only satellite data but also correction service data and/or wheel rotation speeds, steering angles, accelerations and/or engine rotation speeds. A deviation of the GNSS (vehicle) position calculated by the motion and position sensor from the reference position can also be fed back as an input into the network or AI system. The algorithm, i.e. here the network or the AI system, based on the current position deviation (of the motion and position sensor) relative to a reference system and by including the above-mentioned (and other) input variables, can therefore learn the weights and/or threshold values for determining the positional accuracy (of the protection limit in the motion and position sensor). This can be carried out online in the motion and position sensor, for example within test drives, or in a vehicle fleet that is already deployed in the field, wherein the network or the AI system for the positional accuracy can always be further improved, in particular the more traffic scenarios are driven by a given vehicle type. The neural network or the AI system for the positional accuracy (the protection limit) can therefore be advantageously learned with high accuracy, cover a very large number of scenarios and can also respond dynamically to new scenarios.

According to an advantageous design, it is proposed that the adaptation of the algorithm is carried out while or after a vehicle is stopped. The adaptation of the algorithm, in particular of the weights and/or threshold values of the neural network or the AI system for the positional accuracy (the protection limit) can be carried out, for example, by storing an existing algorithm, in particular an already existing network or an already existing AI system, in a cache memory of the motion and position sensor. While the vehicle is driving, the algorithm, in particular the neural network or AI system can only be further adapted (corrected) in particular with regard to the weights and/or threshold values, for example, in this cache memory. While or after the vehicle is stopped, the (part of the) algorithm that was newly learned (during the journey), in particular the newly learned neural network or newly learned KI, from the cache memory, can be used, for example, as a replacement for the algorithm (network or AI system) already used on the motion and position sensor for the positional accuracy (the protection limit). During this process the memory contents can be periodically transferred from the cache memory into the normal motion and position sensor memory. This has the special advantage that the algorithm (network or AI) can calculate a positional accuracy (a protection limit) in real time during a journey with already existing knowledge, but at the same time (in the cache memory) can continue to be adapted (corrected) in the background with the aid of new scenarios.

According to an advantageous design of the method for satellite-based determination of a vehicle position, it is proposed that in order to adapt the algorithm, in particular in step e), a method proposed here for improving the accuracy estimate of a satellite-based determination of a vehicle position is carried out.

According to a further aspect, a computer program is proposed for implementing a method presented here. In other words, this relates in particular to a computer program (product), comprising commands which during the execution of the program by a computer, cause it to execute a method described here.

According to a further aspect, a machine-readable data medium is proposed, on which the computer program described here is stored. Typically, the machine-readable storage medium is a computer-readable data carrier.

According to a further aspect, a motion and position sensor is proposed, which is configured for implementing a method proposed here. For example, the previously described storage medium can form an integral part of the motion and position sensor or be connected thereto. The motion and position sensor is preferably arranged in or on the vehicle or is provided and configured for assembly in or on such. The motion and position sensor is also preferably provided and configured for an autonomous operation of the vehicle, in particular of an automobile. The motion and position sensor or a processing unit (processor) of the motion and position sensor can access, for example, the computer program described here, in order to execute a method described here.

The motion and position sensor is preferably a GNSS sensor. The motion and position sensor can be a position and orientation sensor. In addition, the GNSS sensor can be configured as a GNSS-based position and orientation sensor. GNSS or (vehicle) motion and position sensors are required for the automated or autonomous driving and calculate a highly accurate vehicle position with the aid of navigation satellite data (GPS, GLONASS, Beidou, Galileo), which are also referred to as navigation satellite system, or GNSS, data. The calculation involved is based essentially on a transit time measurement of the (electromagnetic) GNSS signals from at least four satellites. In addition, correction data from so-called correction services can be used in the sensor as well, in order to estimate the position of the vehicle more accurately. Together with the GNSS data received a highly accurate time (such as Universal Time) is also periodically read in by the sensor and used for the accurate positioning. Further input data into the position sensor can be wheel rotation speeds, steering angles, as well as acceleration and rotation speed data. The motion and position sensor is preferably configured to determine an ego position, ego orientation and ego speed on the basis of GNSS data.

The details, features and advantageous embodiments discussed in connection with the method for satellite-based determination of a vehicle position can also occur correspondingly in the method presented here for improving the accuracy assessment of a satellite-based determination of a vehicle position, in the motion and position sensor, the computer program and/or the storage medium, and vice versa. In this respect reference is made to the comments made there for further characterization of the features in their full extent.

BRIEF DESCRIPTION OF THE DRAWINGS

The solution presented here as well as its technical background will be explained in more detail below on the basis of the figures. It should be noted that the disclosure is not intended to be limited by the exemplary embodiments. In particular, unless explicitly indicated otherwise, it is also possible to extract partial aspects of the facts explained in the figures and to combine them with other components and/or information from other figures and/or the present description. They show schematically.

DETAILED DESCRIPTION

Figure 1:
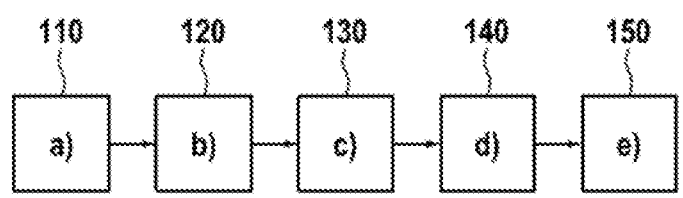
FIG. 1: a sequence of a method presented here for satellite-based determination of a vehicle position for a normal operating process.

FIG. 1 shows a schematic representation of a sequence of a method presented here for satellite-based determination of a vehicle position for a normal operating process. The displayed sequence of method steps a), b), c), d) and e) with the blocks 110, 120, 130, 140, and 150 is provided purely as an example. In block 110, a reception of GNSS satellite data takes place. In block 120 a vehicle position is determined with the GNSS satellite data received in step a). In block 130 input variables are provided that can have an effect on the accuracy of the vehicle position determined in step b). In block 140, a positional accuracy of the vehicle position calculated in step b) is determined using an algorithm which assigns a positional accuracy to a vehicle position. In block 150 an adaptation of the algorithm takes place.

In particular, the method steps a) and c) or b) and c) may also be executed at least partially in parallel or simultaneously.

Figure 2:
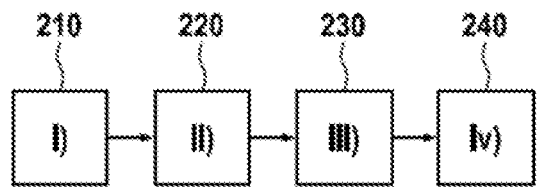
FIG. 2: a sequence of a method presented here for improving the accuracy estimation of a satellite-based determination of a vehicle position for a normal operating process.

FIG. 2 shows a schematic drawing of a sequence of a method presented here for improving the accuracy estimation of a satellite-based determination of a vehicle position for a normal operating process. The displayed sequence of the method steps i), ii), iii), and iv) with the blocks 210, 220, 230, and 240 is provided purely as an example. In block 210 a GNSS-based vehicle position is detected. In block 220 input variables are received that can affect the accuracy of the vehicle position determined in step i). In block 230 a reference position is detected for the vehicle position detected in step i). In block 240 an adaptation is carried out of an algorithm that assigns a positional accuracy to a vehicle position, taking into account at least one comparison between the vehicle position detected in step i) and the reference position acquired in step iii) and/or at least one of the input variables received in step ii).

In particular, the method steps i), ii) and iii) may also be executed at least partially in parallel or simultaneously.

In particular, the solution presented here allows one or more of the following advantages:

- By the introduction of an AI system or neural network for learning a function for determining a positional accuracy, memory can be saved on the motion and position sensor.
- This new AI system can calculate a positional accuracy within a motion and position sensor more accurately on the basis of existing scenarios.
- The memory required for this within the motion and position sensor tends to be significantly smaller than the use of a lookup table.
- The use of a reference position system within an autonomous vehicle for training the AI system (deviation of the satellite-based position determination relative to the reference positioning system) provides a means of continuously improving the AI system for the positional accuracy on the motion and position sensor on the basis of new scenarios of vehicles already existing in the field.
- The more accurate computation of the positional accuracy, or the output of this improved positional accuracy from the motion and position sensor, leads to an increase in traffic safety in vehicles which use a motion and position sensor, since the other control units know exactly whether or not they can currently trust the position delivered by the motion and position sensor.

What is claimed is:

1. A method for establishing a protection limit of a satellite-based determination of a vehicle position, the method comprising:
   receiving at least one global navigation satellite system (GNSS) satellite signal with a GNSS receiver;
   determining a vehicle position of a vehicle using data from the received at least one GNSS satellite signal;
   determining a protection limit of the determined vehicle position using an algorithm that assigns a protection limit to the determined vehicle position using the determined vehicle position, wherein determining the protection limit is carried out by a vehicle component;
   providing the determined vehicle position and the assigned determined protection limit to a control unit of the vehicle; and
   adapting the algorithm based upon the determined protection limit.

2. The method according to claim 1, wherein adapting the algorithm is carried out remotely to the vehicle, the method further comprising:
   transmitting the adapted algorithm to the vehicle.

3. The method according to claim 1, wherein the algorithm determines the protection limit as based on the determined vehicle position and at least one input variable that affects accuracy of the determined vehicle position.

4. The method according to claim 1, wherein the adapting the algorithm further comprises:
   detecting a GNSS-based vehicle position of the vehicle;
   at least one of receiving input variables that affect accuracy of the detected GNSS-based vehicle position, and detecting a reference position for the detected GNSS-based vehicle position; and
   adapting an algorithm that assigns a protection limit to the detected GNSS-based vehicle position based on at least one of a comparison between the detected GNSS-based vehicle position and the detected reference position and a comparison between the detected GNSS-based vehicle position and at least one of the received input variables.

5. The method according to claim 1, wherein the method is carried out by at least one computer program.

6. The method according to claim 1, wherein the computer program is stored on at least one machine-readable storage medium.

7. A method for improving the accuracy estimation of a protection limit of a satellite-based determination of a vehicle position, the method comprising:
   detecting a global navigation satellite system (GNSS)-based vehicle position of the vehicle using a GNSS receiver;
   at least one of receiving input variables that affect accuracy of the detected GNSS-based vehicle position, and detecting a reference position for the detected GNSS-based vehicle position;
   adapting an algorithm that assigns a protection limit to the detected GNSS-based vehicle position based on at least one of a comparison between the detected GNSS-based vehicle position and the detected reference position and a comparison between the detected GNSS-based vehicle position and at least one of the received input variables, wherein the adaptation of the algorithm is carried out automatically; and
   providing the assigned protection limit and at least one of the detected GNSS-based vehicle position and the detected reference position to a control unit of the vehicle.

8. The method according to claim 7, wherein the method is carried out at least partially remotely to the vehicle.

9. The method according to claim 7, wherein the method is carried out entirely by a vehicle component.

10. The method according to claim 7, wherein the algorithm is a neural network having at least one of weights and threshold values.

11. The method according to claim 10, wherein, in adapting the algorithm, the at least one of the weights and the threshold values of the algorithm are adjusted.

12. The method according to claim 7, wherein the adapting of the algorithm is carried out one of while the vehicle is stopped and after the vehicle is stopped.

13. A motion and position sensor configured to carry out a method for satellite-based determination of a vehicle position, the method comprising:
   receiving global navigation satellite system (GNSS) satellite data;
   determining a vehicle position of a vehicle with the received GNSS satellite data;
   determining a protection limit of the determined vehicle position using an algorithm that assigns a protection limit to the vehicle position based upon the determined vehicle position;

providing the determined vehicle position and the assigned determined protection limit to a control unit of the vehicle; and adapting the algorithm based upon the determined protection limit wherein the adaptation of the algorithm is carried out automatically.

\* \* \* \* \*